United States Patent
Gopal et al.

(10) Patent No.: US 7,730,356 B2
(45) Date of Patent: Jun. 1, 2010

(54) METHOD AND APPARATUS FOR TESTING MATHEMATICAL ALGORITHMS

(75) Inventors: Vinodh Gopal, Westboro, MA (US); John Vranich, West Roxbury, MA (US); Pierre Laurent, Quin County Clare (IE); Daniel Cutter, Maynard, MA (US); Wajdi K. Feghali, Boston, MA (US); Andrew Milne, Ottawa (CA); Erdinc Ozturk, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 11/864,896

(22) Filed: Sep. 28, 2007

(65) Prior Publication Data

US 2009/0089617 A1 Apr. 2, 2009

(51) Int. Cl.
*G06F 11/00* (2006.01)

(52) U.S. Cl. .......................... 714/41; 712/227; 708/530

(58) Field of Classification Search ............... 714/41; 712/227; 708/530
See application file for complete search history.

(56) References Cited

U.S. PATENT DOCUMENTS

| | | | |
|---|---|---|---|
| 2003/0172321 A1* | 9/2003 | Wolin et al. ................... 714/41 |
| 2004/0044717 A1* | 3/2004 | Makineni et al. ............ 708/530 |
| 2005/0071818 A1* | 3/2005 | Reissman et al. ........... 717/127 |
| 2007/0174679 A1* | 7/2007 | Chelstrom et al. ............. 714/8 |
| 2009/0006517 A1* | 1/2009 | Gopal et al. ................. 708/492 |
| 2009/0089617 A1* | 4/2009 | Gopal et al. .................. 714/32 |

* cited by examiner

*Primary Examiner*—Emerson C Puente
(74) *Attorney, Agent, or Firm*—Caroline M. Fleming

(57) ABSTRACT

A method and apparatus for testing mathematical programs where code coverage is exceedingly difficult to hit with random data test vectors (probability $<2^{-64}$) is provided. To enable testing of the mathematical program, instructions in the mathematical program are trapped. Errors are injected through the use of any status/control flag where an error can be created and be rectified later by a reversible operation so that the result of the mathematical operation is not modified by the injected error.

21 Claims, 5 Drawing Sheets

METHOD AND APPARATUS FOR TESTING MATHEMATICAL ALGORITHMS

FIELD

This disclosure relates to public key cryptography and in particular to testing mathematical algorithms used for public key cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

Typically, a processor includes a Public Key Encryption (PKE) unit that performs cryptographic computations with very high performance. The PKE unit accelerates large modular exponentiation problems and is optimized to work with operands in the range of 512 to 4096 bits.

In protocols such as RSA or DH the main operation is a large modular exponentiation with operands in the range of 512 to 4096 bits (or higher for ultra-secure applications). The exponentiation algorithms perform repeated modular squaring or multiplication operations, which consist of multiplication followed by reduction steps. The reductions may be performed by a variety of techniques such as Montgomery reduction or Barrett's reduction.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
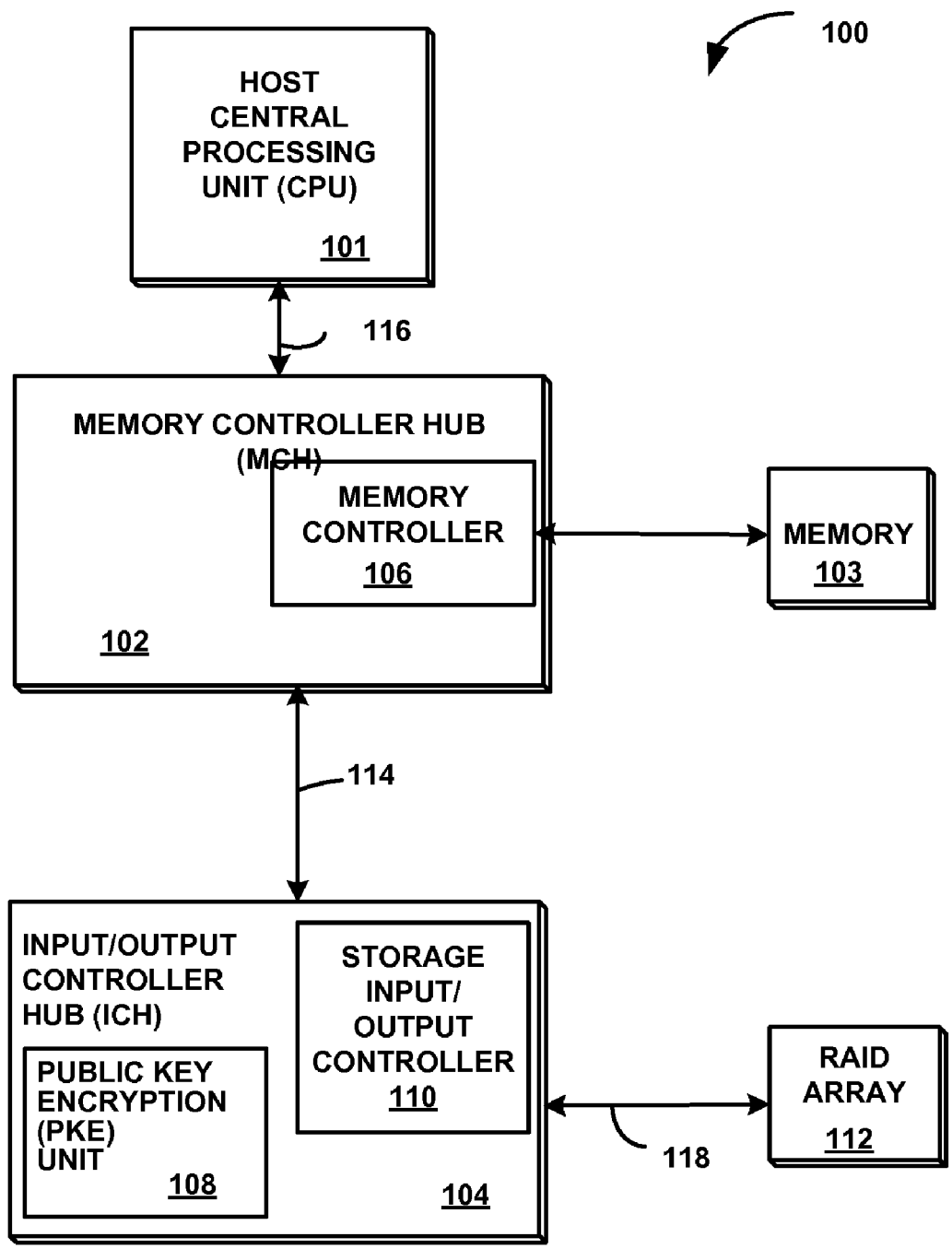
FIG. 1 is a block diagram of a system that includes an embodiment of a public key encryption (PKE) unit.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

In a modified form of Barrett's reduction that performs reduction by a series of multi-precision multiplications, there is a need to accurately design and verify multiplication routines. These multiplication routines may be implemented in micro-code programs.

While random input test vectors can exercise most code-paths in the multiplication routines, there are code paths that cannot be guaranteed to be reached through the use of random test vectors. For example, code paths for processing carries that need to propagate arbitrary distances in a large vector addition operation during the summation of partial products in a multiply routine may be difficult to test. The difficulty of testing these code paths is exacerbated in algorithms that use Karatsuba multiplications and/or modified Barrett's reductions because these algorithms tend to produce sub-vectors with extra carry bits at various locations in a multi-precision vector result.

Methods for testing multiplication routines include constructing special moduli for checking hardware implementations such as dedicated Montgomery multipliers. However, this method is not suitable for large multipliers, that is, multipliers that operate with operands in the range 512-bits to 4096-bits. Other techniques rely on comparing one implementation versus another implementation to get confidence, whereas the precise coverage itself is not directly addressed. Probabilistic methods can be applied to bound the probability of error in the system via batch verification of exponentiations using sparse/complex exponents. Another method is to compute additional residue codes that bound the errors within some small probability.

It is exceedingly difficult to create specialized test vectors for each program that can exercise the code path for handing processing of status/control flags in a system that performs cryptographic computations. Typically, the PKE unit includes a modular math processor (MMP). The MMP is a vector-processor that can perform Arithmetic Logical Unit (ALU) operations (such as add/subtract/shift/logical operations) on arbitrary length vectors. When adding two vectors of unequal length, a carry generated by the low portions of the vectors may need to propagate an arbitrary distance into the high portion of the result. The occurrence of this carry is very improbable when the data bits are random, as in $p=2^{-64}$. Thus, it becomes exceedingly difficult to validate any cryptographic algorithm that performs modular operations on large vectors (for example, 512-4096-bits) with random data. It is also exceedingly difficult to create specialized test vectors for each program that can exercise the code path for handling the processing of the propagation of the carry, for example, use of the carry flag in the ALU status/control flags.

For example, the Karatsuba (KA) algorithm may be used to multiply two 1536 bit numbers (A, B) each with three sections of 512-bit digits ($A_0, A_1, A_2, B_0, B_1, B_2$) by computing partial products: (A0*B0), (A1*B1), (A2*B2), (A2*B1+A1*B2), (A1*B0+A0*A0*B1) and (A2*B0+A0*B2)*($B_1$+$B_0$). The partial products (A0*B0), (A1*B1) and (A2*B2), are 1024-bit numbers. The partial products (A2*B1+A1*B2), (A1*B0+A0*A0*B1) (A2*B0+A0*B2) are 1025 bit numbers because they involve both multiplication and addition operations, with bit 1025 being the carry bit. When adding the partial products, the carry propagation code path is executed only if there is a carry (that is, bit 1025 is '1') and all bits of the partial product are '1'. Generating test vectors (values) for operands A and B that generate the carry are extremely dependent on the processing order of the addition of the partial products. For example, adding the partial products in a different order with the same initial test vectors for A and B may result in less carry propagation.

It is exceedingly difficult to analyze a mathematical program and construct such data vectors. For operations other than multiplication, it is difficult to select data values for A and B that can exercise code-paths after subsequent operations such as repeated squaring, multiplications and modular reductions in a modular exponentiation algorithm.

An embodiment of the present invention tests mathematical programs where code paths (that is, a subset of the instructions in the mathematical program) are exceedingly difficult to hit with random data test vectors (probability $<2^{-64}$). Instead of generating test vectors, black-box checking of mathematical program code is performed by injecting errors during program execution to test code paths that are difficult to test. The effects of the injected errors are reversed at a later point in a way that preserves mathematical correctness such that the result of the mathematical operation is not modified by the injected error. In an embodiment, the black-box checking proves program correctness in terms of carry/borrow propagation when adding/subtracting multi-precision vectors via judicious error injection.

Error-injection is the process of inserting a complementary pair of data modifications while the code under test is running. The error-injection is performed in a manner that allows coverage of all code paths, for example, exception handling without changing the expected result of the program. Instructions are trapped and errors are injected, so that if the code path that is tested is correct, the expected result is provided.

Injecting errors during program execution enables carry-handling in all subroutines to be executed and thus enables black-box checking of mathematical program code. The effects of the errors are reversed at a later point in a manner that preserves mathematical correctness.

FIG. 1 is a block diagram of a system 100 that includes an embodiment of a Public Key Encryption (PKE) unit 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 103. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 103 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
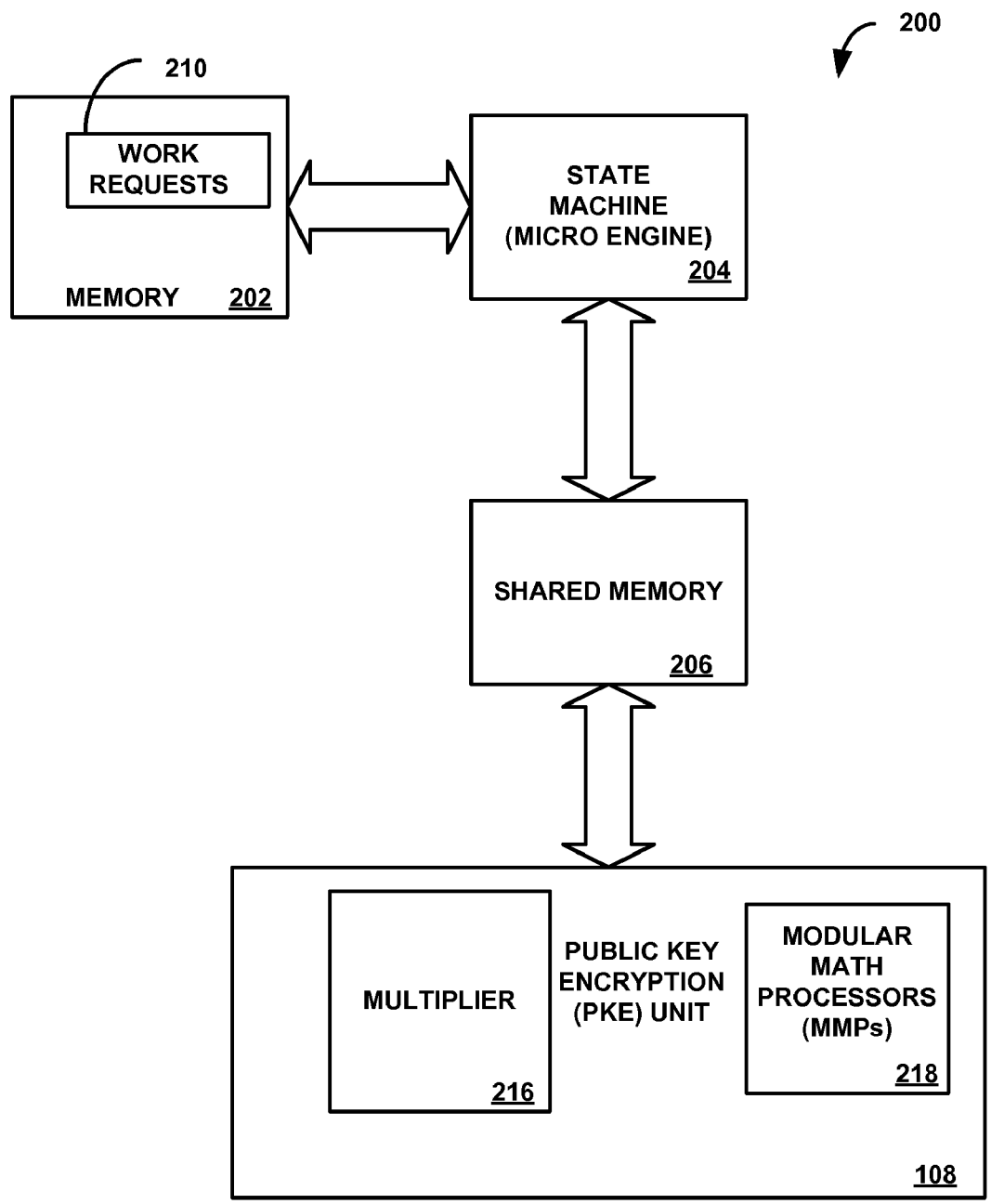
FIG. 2 is a block diagram of a system that includes the PKE unit shown in FIG. 1.

FIG. 2 is a block diagram of a system 200 that includes the PKE unit 108 shown in FIG. 1.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in public key protocols such as Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and multipliers 216. The PKE unit 108 may perform modular arithmetic on large numbers. An example of modular arithmetic is a modular exponential operation such as, $g^e$ mod m where g is the base, e is the exponent and m is the modulus.

Figure 3:
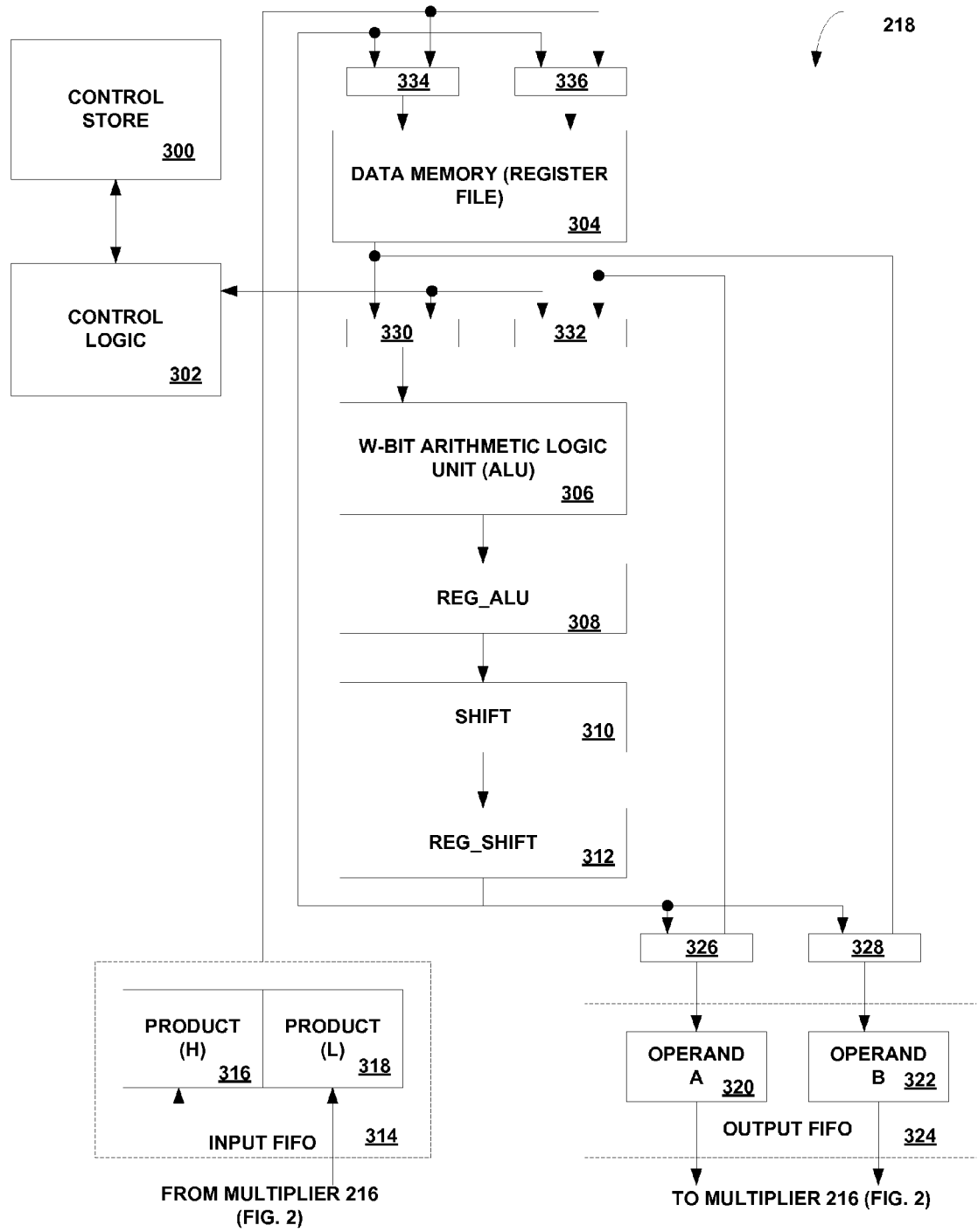
FIG. 3 is a block diagram of an embodiment of a modular math processor in the PKE unit shown in FIG. 2.

FIG. 3 is a block diagram of an embodiment of a modular math processor (MMP) 218 in the PKE unit 108 shown in FIG. 2. The MMP 218 is a vector-processor that can perform Arithmetic Logical Unit (ALU) operations such as add, subtract, shift, and logical operations on arbitrary length vectors. As discussed in conjunction with FIG. 2, the PKE unit 108 also includes a generic multiplier 216 that may be shared by many MMPs 218 through dedicated First In First Out (FIFO) s, for example, input FIFO 314 and output FIFO 324.

In the embodiment shown in FIG. 3, the MMP 218 is a 64-bit processor that includes a control store 300 for storing micro-code programs of different algorithms required in public key protocols and control logic 302 that controls various elements of the MMP 218 based on the stored micro-code programs. Instructions in the micro-code programs include a plurality of setup instructions, branch instructions, exec instructions and FIFO instructions.

The FIFO instructions send problems to the multiplier 216 through output FIFO 324 and receive results of problems (products 316, 318) from the multiplier 216 through input FIFO 314. The set up instructions set various control variables and global variables. The exec instructions perform ALU operations on a multi-precision vector using operands stored in a register file 304. A fexec instruction combines some features of the exec and the FIFO instructions by operating on one operand from the register file 304 and another from the result (input) FIFO 314.

Operand A 320 and operand B 322 are sent to the multiplier through output FIFO 324. The source of the operands 320, 322 is either data memory 304 or shift register 312 with the source selectable through multiplexers 326, 328. The result of the multiplication, products 316, 318 is received from the multiplier 216 through input FIFO 314. The products 316, 318 may be stored in data memory 304 through multiplexers 334, 336. Operands stored in data memory 304 may be directed to the ALU 306 through multiplexers 330, 332 or directly to the output FIFO to the multiplier 216. A shift register 310 performs shift operations.

The control logic 302 may cause a subset of the instructions stored in the control store for handling a condition to be executed by injecting an error. The error may be injected by the control logic 302 by corrupting the state of a flag used to report the condition. The control logic 302 subsequently corrects the error such that the result of a mathematical operation is not modified by the injected error.

In an embodiment, the control logic 302 includes a control register that includes a debug field to enable/disable error injection. An ALU register includes a plurality of status/control flags such as carry and borrow flags that may be set or cleared by the ALU to inject an error if enabled by the control logic 302 based on whether the error injection has been enabled.

In order to test code paths in the code stored in the control store 300 that are difficult to test, an error is injected by forcing a status/control flag to a specific value and later reversing the error. For example, to test a code path for handling propagation of a carry resulting from an addition operation in the ALU 306, an ALU carry flag in the ALU status/control register 308 is forced to '1' by setting the ALU carry flag (equivalent to incrementing word N) in conjunction with decrementing word N to maintain mathematical correctness of the overall vector, that is, words N:0. For example, when a determination has been made that an error is to be injected, another write is initiated to word N (smaller that the current value by 1) and the register field for the carry flag is set either in the same cycle or in different cycles. These events occur in conjunction with each other such that both events are recorded. If the executed code path is correctly constructed to handle the carry/borrow or other underflow/overflow cases, the program eventually branches into carry handling subroutines and nullifies the injected errors. A carry handling routine operates on a single word and increments each word as long as a carry flag is set. If the code path is incorrectly constructed, the result of the mathematical operation will be incorrect. Thus, with any test whose answer is known, with the "error injection" feature turned 'on', the program is correct if the final results compare with the known answer. In an embodiment, the "error injection" feature is turned on through a control register field in the control logic 302 designated to enable debug/test of an MMP program. Code coverage and traces may be used to verify that all statistically unreachable subroutines (subset of instructions in the program) and code-paths in the program have been executed.

Figure 4:
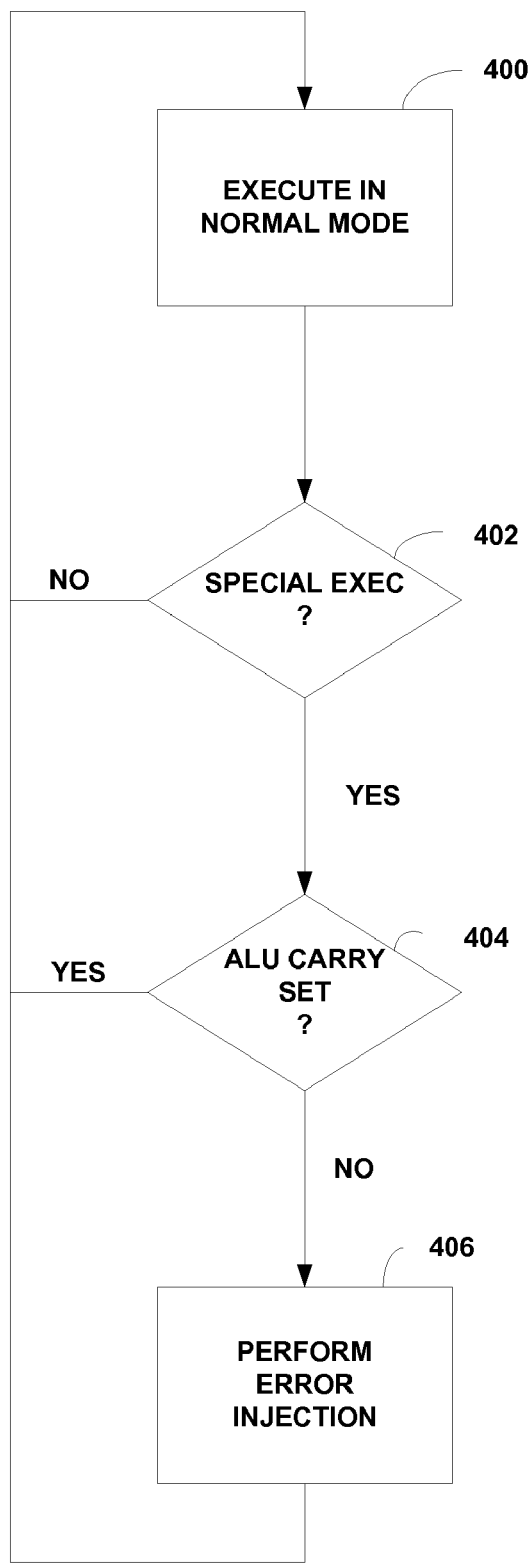
FIG. 4 is a flowchart illustrating an embodiment of an algorithm that may be used to exercise code paths for handling carry propagation for an addition operation according to the principles of the present invention.

FIG. 4 is a flowchart illustrating an embodiment of an algorithm that may be used to exercise code paths for handling carry propagation for an addition operation according to the principles of the present invention. FIG. 4 will be described in conjunction with the embodiment of the MMP 218 shown in FIG. 3.

At block 400, an MMP program is executed in normal mode. It is assumed that the A and B operands each have the maximum number of 16-bit words. In one embodiment, the maximum number of words is 256 (4096 bits). Processing continues with block 402.

At block 402, if the MMP program detects a special exec (addition) instruction, processing continues with block 404. A special exec instruction is one that has all of the following properties: (1) Size of vectors=$1+2^n$, for some n>=0; (2) Performs an addition with accumulate (no shift) of the form: A[x:y]=A[x:y]+B[i:j]// x>y & (x-y)>=(i-j); (3) The Most Significant Word (MSW) of B, B[i] has too many leading zeros (32); and (4) The Most Significant Words (MSW) of A's index x<(MAX-1) and (A[x+1]>0).

The check for a special exec instruction may be modified. For example, the 32 leading-zeros may be reduced, if required. Further modifications include checking different sizes of vectors. However, in an embodiment, the four checks listed above are sufficient to obtain the coverage goals for the MMP program. If a special exec instruction is not detected, processing continues with block 400 to continue to execute the MMP program in normal mode.

At block 404, after the final word of the special exec instruction, the state of the ALU carry flag is checked. If the ALU carry flag is set, no further action need be taken because the code path for processing the ALU carry flag will be executed, processing continues with block 400 to continue to execute the MMP program in normal mode. If the ALU carry flag is not set, processing continues with block 406.

At block 406, as the ALU carry flag was not set, error injection is performed in the ALU 306 to set the ALU carry flag to allow the code path for processing the ALU carry flag to be tested. The ALU carry flag is set to logical 1 and other processing is performed as if the addition operation had indeed produced a carry. Next, the injected error (setting of the ALU carry flag in the ALU register 308 by forcing the ALU carry flag to logical 1 when the result of the addition operation did not result in a carry) is reversed by performing a decrement operation on A[x+1] as A[x+1]—. The decrement operation cannot result in a borrow from A[x+2] because A[x+1]>0. Processing continues with block 400 to perform normal processing.

If a carry-handling code path (segment or subset of instructions) in the MMP program's current execution path is correct, this segment is invoked at some point to add the carry into A[x+1], thereby correcting the injected error. If the MMP program fails to add the carry, the final result fails the check against a known answer from a math analysis or defined in a standard. Thus, if the carry-handling code segment is correct, the effect of the injected error (added carry) is reversed in a way that preserves mathematical correctness.

In an embodiment, there is a control field in a configuration register in the control logic 302 through which the error injection feature may be enabled or disabled.

The embodiment in FIG. 4 performs testing for operand A 320. Operand B 322 may be tested in a similar manner, for example, through the use of the exec instruction, using the instruction syntax "exec b=b+a". The operation of the fexec instruction may also be tested in a similar manner by replacing exec with fexec and b with FIFO, for example, using the following instruction syntaxes "fexec a=a+FIFO" or "fexec b=b+FIFO"

Figure 5:
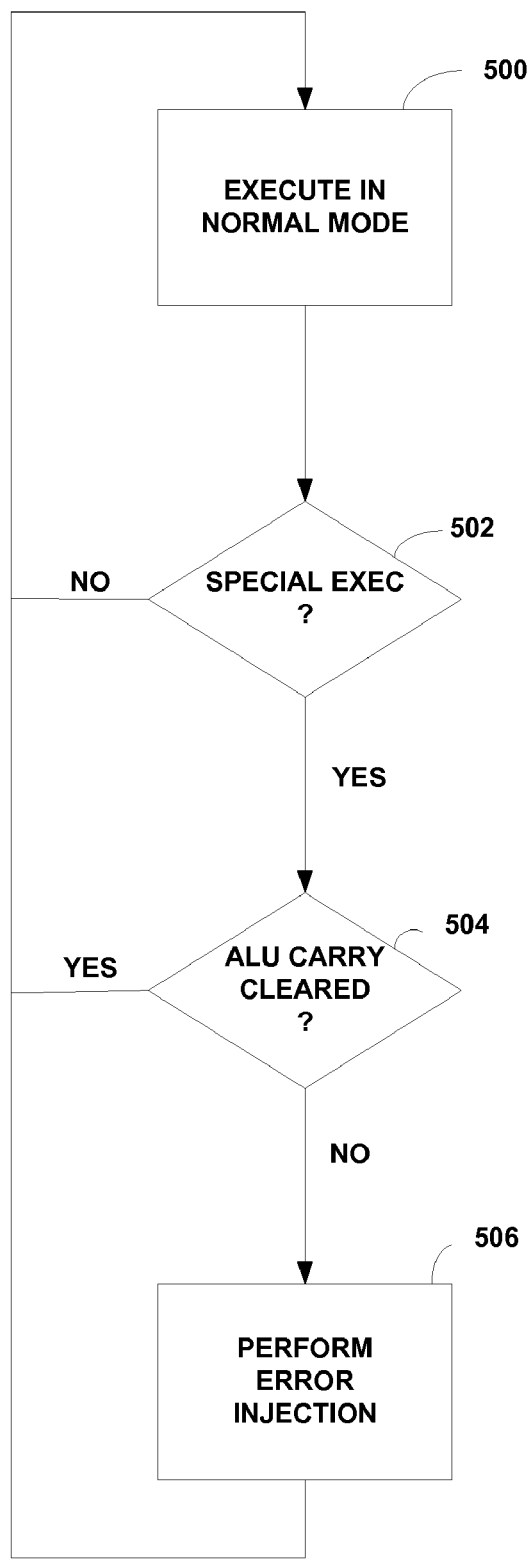
FIG. 5 is a flowgraph illustrating an embodiment of an algorithm that may be used to exercise code paths for handling borrow propagation for a subtraction operation according to the principles of the present invention.

FIG. 5 is a flowgraph illustrating an embodiment of an algorithm that may be used to exercise code paths for handling borrow propagation for a subtraction operation according to the principles of the present invention.

At block 500, the MMP program is executed in normal mode. Processing continues with block 502.

At block 502, if the MMP program detects a special exec (subtraction) instruction, processing continues with block 504. A special exec instruction is one that has all of the following properties: (1) Size of vectors=$1+2^n$, for some n>=0; (2) Performs a subtract with accumulate (no shift) of the form: A[x:y]=A[x:y]−B[i:j]// x>y & (x-y)>=(i-j); (3) The Most Significant Word (MSW) of B, B[i] has too many leading zeros (>32); and (4) The Most Significant Words (MSW)s of A's index x<(MAX-1) and (A[x+1]<FFF . . . F).

The check for a special exec instruction may be modified. For example, the 32 leading-zeros may be reduced, if required. Further modifications include checking different sizes of vectors. However, in an embodiment, the four checks listed above are sufficient to obtain the coverage goals for the MMP program. If a special exec instruction is not detected, processing continues with block 500 to continue to execute the MMP program in normal mode.

At block 504, after the final word of the special exec instruction, if the ALU carry flag has been cleared (that is, logical 0) or an ALU borrow flag has been set, in an embodiment in which there is both an ALU carry flag and an ALU borrow flag no further action need be taken, processing continues with block 500 to continue to execute the MMP program in normal mode. If the ALU carry flag has not been cleared or the ALU borrow flag has not been set, processing continues with block 506.

At block 506, the ALU carry flag was not cleared or the ALU borrow flag was not set, so error injection is performed to test the code segment for processing the borrow condition. In an embodiment in which there is no ALU borrow flag, first, the ALU carry flag is forced to logical 0 and any side-effects in the model that would be set are set as if the final add operation had produced a borrow, that is, ALU carry flag=0. Next, an increment operation is performed on A[x+1] as A[x+1]++. The increment operation cannot result in a carry into A[x+2] because A[x+1]<FF . . . F. Processing continues with block 500.

Embodiments have been described that involve the ALU carry flag or ALU borrow flag. However, the invention is not limited to these ALU flags. Any ALU status/control flag may be used to perform error injection, if an error can be injected/created and rectified later by a reversible operation. An embodiment may be implemented in micro-instructions or in silicon as a debug mechanism for a processor.

An embodiment has been described in the context of RSA/DH protocols. However, an embodiment may be used for other cryptographic schemes such as Elliptic Curves. An embodiment may also be used for functional models of other mathematical units such as floating-point units where it is difficult to test corner-cases without, formal verification, for example, extreme corners of test vector space that are almost impossible to hit with random tests.

In an embodiment that uses carry and borrow flags, 100% code coverage may be achieved on almost all PKE mathematical library programs. The execution of any mathematical program is elegantly tracked. In one embodiment a special mode of operation detects specific vector operations that combined with some data values make it extremely hard to branch to and execute segments of program code. When such instructions are detected, errors are injected using status/control flags and corresponding data registers or memory locations. The injected errors force a correct program to enter carry handling code at some later point in execution and correct the error. An incorrect program would not enter the exception code and thus errors would rapidly propagate making the final result miscompare against a known answer.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
    a control store to store instructions for performing a mathematical operation on operands having a size that is greater than or equal to 512 bits; and
    control logic coupled to the control store, the control logic to cause a subset of the instructions to be executed, the subset of instructions to handle a condition that occurs while the mathematical operation is being performed, the control logic to inject an error by corrupting the state of a flag used to report the condition such that the subset of instructions is executed and subsequently correcting the error such that the result of the mathematical operation is not modified by the injected error.

2. The apparatus of claim 1, wherein the mathematical operation is modular exponentiation.

3. The apparatus of claim 1, wherein the operands are in the range of 512 to 4096 bits.

4. The apparatus of claim 1, wherein the condition is difficult to reproduce through selection of values for the operands.

5. The apparatus of claim 1, wherein the flag is an Arithmetic Logic Unit (ALU) carry flag.

6. The apparatus of claim 1, wherein the flag is an Arithmetic Logic Unit (ALU) borrow flag.

7. The apparatus of claim 1, wherein the control logic is included in a modular math processor (MMP).

8. The apparatus of claim 1, wherein the injected error permits testing of statistically unreachable subroutines and code-paths in a program for performing the mathematical operation.

9. The apparatus of claim 1, wherein the flag is an Arithmetic Logic Unit (ALU) carry flag and the injected error is corrected by modifying contents of one of the operands by one.

10. A method comprising:
    storing instructions for performing a mathematical operation on operands having a size that is greater than or equal to 512 bits; and
    causing a subset of the instructions to be executed, the subset of instructions to handle a condition that occurs while the mathematical operation is being performed by:
        injecting an error by corrupting the state of a flag used to report the condition such that the subset of instructions is executed; and
    subsequently correcting the error such that the result of the mathematical operation is not modified by the injected error.

11. The method of claim 10, wherein the mathematical operation is modular exponentiation.

12. The method of claim 10, wherein the operands are in the range of 512 to 4096 bits.

13. The method of claim 10, wherein the condition is difficult to reproduce through selection of values for the operands.

14. The method of claim 10, wherein the condition flag is an Arithmetic Logic Unit (ALU) carry flag.

15. The method of claim 10, wherein the control logic is included in a modular math processor (MMP).

16. The method of claim 10, wherein the injected error permits testing of statistically unreachable subroutines and code-paths in a program for performing the mathematical operation.

17. The method of claim 10, wherein the flag is an Arithmetic Logic Unit (ALU) carry flag and the injected error is corrected by modifying contents of one of the operands by one.

18. An article including a computer usable medium having associated information, wherein the information, when accessed, results in a computer performing:
   storing instructions for performing a mathematical operation on operands having a size that is greater than or equal to 512 bits; and
   causing a subset of the instructions to be executed, the subset of instructions to handle a condition that occurs while the mathematical operation is being performed by:
      injecting an error by corrupting the state of a flag used to report the condition such that the subset of instructions is executed; and
      subsequently correcting the error such that the result of the mathematical operation is not modified by the injected error.

19. The article of claim 18, wherein the mathematical operation is modular exponentiation.

20. The article of claim 18, wherein the operands are in the range of 512 to 4096 bits.

21. A system comprising:
   a dynamic random access memory to store data and instructions; and
   a processor coupled to the memory to execute the instructions, the processor comprising:
      a control store to store instructions for performing a mathematical operation on operands having a size that is greater than 512 bits; and control logic coupled to the control store, the control logic to cause a subset of the instructions to be executed, the subset of instructions to handle a condition that occurs while the mathematical operation is being performed, the control logic to inject an error by corrupting the state of a flag used to report the condition such that the subset of instructions is executed and subsequently correcting the error such that the result of the mathematical operation is not modified by the injected error.

* * * * *